UNITED STATES PATENT OFFICE.

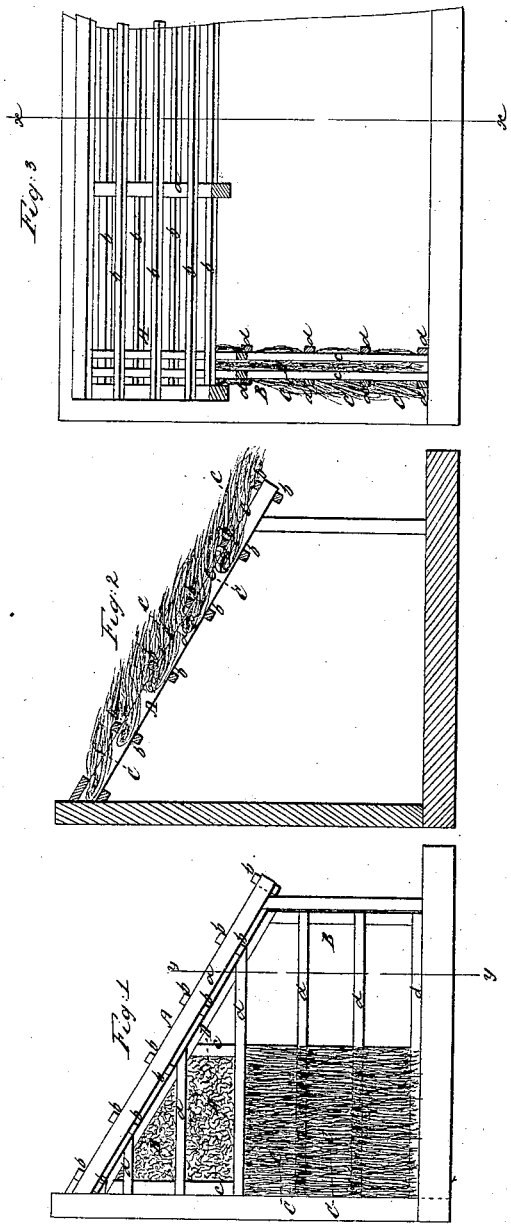

JAMES WEED, OF MUSCATINE, IOWA.

IMPROVEMENT IN THATCHING ROOFS.

Specification forming part of Letters Patent No. 43,055, dated June 7, 1864.

*To all whom it may concern:*

Be it known that I, JAMES WEED, of Muscatine, in the county of Muscatine and State of Iowa, have invented a new and useful Improvement in Thatching; and I do hereby declare that the following is a full, clear, and exact description of the same, reference being had to the accompanying drawings, making a part of this specification, in which—

Figure 1 is a side view of a structure partially thatched according to my invention. Fig. 2 is a transverse vertical section of the same, taken in the line $x\,x$, Fig 3. Fig. 3 is a longitudinal vertical section of the same, taken in the line $y\,y$, Fig. 1.

Similar letters of reference indicate corresponding parts in all the figures.

The object of this invention is to obtain a means whereby the straw of machine-thrashed grain may be used for thatching purposes. Straw thatch was formerly used to a great extent for roofing purposes when grain was thrashed by hand with a flail, and the straw left in an unbroken state; but of late years it has been mostly abandoned on account of the very general introduction of the labor-saving thrashing-machine, which leaves the straw in a broken and tangled state, utterly unfit for the purpose of thatching as hitherto practiced.

My invention consists in attaching strips to both sides of the rafters of a roof, as well as to both sides of the studs of a building, in such a manner that the exterior straw will be held between the strips by its own elasticity, the space between the strips, if desired, being filled with straw or other similar or suitable material, by which the straw of machine-thrashed grain may be used for the purpose specified.

To enable those skilled in the art to fully understand and construct my invention, I will proceed to describe it.

A represents the roof of a structure or building, $a$ being the rafters, and $b$ strips or laths attached transversely thereto at both their upper and lower surfaces. as shown clearly in Figs. 1 and 2, said strips at the upper and lower side of the rafters being in line with each other—that is to say, arranged in pairs, each pair being in a plane which passes through the rafters at right angles, as shown in Fig. 2.

B represents the sides of a building, and $c$ the studs thereof, with strips or laths $d$ nailed horizontally to them at both their inner and outer sides. Single thick studs may be used, or thin studs placed in parallel rows with a suitable space between them, as shown clearly in Fig. 3, the strips or laths $d$ being like those on the roof, arranged in pairs in horizontal planes.

C represents the straw thatch, which is collected or divided into small bunches, and doubled and inserted between the strips or laths of the sides and roof of the structure, commencing at the lowest part of both the sides and the roof and working upward, so that each layer of thatch will lap over the layer immediately beneath it, as shown more particularly in Figs. 2 and 3. The straw is retained between the strips or laths by its own elasticity, and the said strips or laths are to be nailed on the rafters or studs at a greater or less distance apart, according to the length of the straw. The thatch when finished is lightly raked off to remove superfluous or loose straw.

If necessary or desirable, the space between the strips or laths at the sides of the structure may be first filled with straw, leaves, or other similar or suitable meterial, D, and the thatching, straw afterward applied. This would insure warmth, and to further this end wide strips or laths may be used for roofing to admit of this filling-in process. By this plan or mode of thatching the work may be done by any person of ordinary ability, no tying being required, and repairs may be made with the greatest facility when necessary.

Having thus described my invention, what I claim as new, and desire to secure by Letters Patent, is—

1. The applying for thatching purposes of straw to the roofs and sides of buildings by inserting the former between strips or slats attached to both sides of the rafters and studs, substantially as herein set forth.

2. The filling in or packing of the space between the strips or laths at both sides of the rafters and studs with straw or other suitable material, when used in connection with the external layers of straw, for the purpose specified.

JAMES WEED.

Witnesses:
H. W. MOORE,
JACOB FISH.